(12) United States Patent
Johnson

(10) Patent No.: US 6,216,125 B1
(45) Date of Patent: Apr. 10, 2001

(54) COARSE INDEXES FOR A DATA WAREHOUSE

(75) Inventor: Theodore Johnson, New York, NY (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/109,516

(22) Filed: Jul. 2, 1998

(51) Int. Cl.[7] .................................................. G06F 17/30

(52) U.S. Cl. ..................... 707/4; 707/2; 707/3; 707/102; 706/12; 705/52; 705/54; 379/220

(58) Field of Search .................................. 707/1–4, 6, 7, 707/100, 102, 104, 501, 517; 717/11; 705/52, 54, 80; 379/220; 713/200; 706/12

(56) References Cited

U.S. PATENT DOCUMENTS

| | | | | |
|---|---|---|---|---|
| 3,678,461 | * | 7/1972 | Choate et al. | 706/12 |
| 5,551,027 | * | 8/1996 | Choy et al. | 707/1 |
| 5,649,181 | * | 7/1997 | French et al. | 707/3 |
| 5,710,915 | * | 1/1998 | McElhiney | 707/3 |
| 5,794,229 | * | 8/1998 | French et al. | 707/2 |
| 5,819,256 | * | 10/1998 | Ozbutun et al. | 707/2 |
| 5,907,297 | * | 5/1999 | Cohen et al. | 341/95 |
| 5,924,088 | * | 7/1999 | Jakobsson et al. | 707/2 |
| 5,960,194 | * | 9/1999 | Choy et al. | 707/102 |
| 6,003,036 | * | 12/1999 | Martin | 707/102 |

OTHER PUBLICATIONS

Dehmeshki, J. et al., "Classification of coal images by a multi–scale segmentation techniques", Proceedings of the 1995 International Symposium on Computer Vision, Nov. 21–23, 1995, pp. 271–276.*

Dharanipragada, S. et al., "A fast vocabulary independent algorithm for spotting words in speech", Proceedings of the 1998 IEEE International Conference on Acoustics, Speech and Signal processings, May 12–15, 1998, vol. 1, pp. 233–236.*

Raisch, J., "Qualitative control with quantitative Models", Second International Conference on Intelligent Systems Engineering, Sep. 5–9, 1994, Conference Publication No. 395, pp. 229–234.*

Yuen H. et al., "Efficient variable rate vector quantization using quadtree segmentation", IEEE Transaction on Consumer Electronics, May 1996, vol. 42, Issue: 2, pp. 212–215.*

P. O'Neil and D. Quass, "Improved Query Performance With Variant Indexes," *SIGMOD* '97, Tucson, Arizona, May 1997, pp. 1–12.

* cited by examiner

*Primary Examiner*—Hosain T. Alam
*Assistant Examiner*—Shahid Alam

(57) ABSTRACT

A coarse database index, and system and method of use therefor, that will quickly indicate which data partitions of a table contain a given key. Once the target data partitions are located, the exact record locations can be found using traditional indexes. The coarse indexes take little space, can be updated quickly, and searched quickly. The coarse index is in conjunction with a database including a plurality of data partitions. Each data partition includes data, including a plurality of key values of at least one key, and at least one dense index referencing the data. The coarse index indexing the plurality of key values according to data partitions containing each key value. The coarse index includes a first bitmap, which is preferably arranged in key value major format. The coarse index may also include a second bitmap, which is preferably arranged in data partition major format. The second bitmap may be transformed from data partition major format to key value major format. The first and second bitmap partitions may be compressed.

11 Claims, 5 Drawing Sheets

COARSE INDEXES FOR A DATA WAREHOUSE

FIELD OF THE INVENTION

The present invention relates to indexing of very large databases.

BACKGROUND OF THE INVENTION

Data warehouses allow an organization to gather, store and make use of operational data, that is, information collected during normal operations. For example, a large retail store chain may warehouse cash register transactions to identify trends, e.g., what products are popular in different regions of the country. A typical data warehouse will receive a feed of detail dam Because of the large volume of detail data in the warehouse, many data warehouse features involve computing aggregate statistics of the detail data, and mining the aggregate statistics.

In many cases, it is desirable to retrieve specific records from the stored detail data For example, a telecommunications provider must be able to provide records of phone calls originated by or received by individuals in response to law enforcement requests. Since records of phone calls involving a particular phone number are very sparse in the data set, indexing is necessary to retrieve these records efficiently.

The detail data is usually collected continuously in time. The large size of the detail data set requires the use of horizontal partitioning. One reason is the limit on the maximum file size in many operating systems (typically 2 Gbytes). Another reason to use partitioning is to simplify data management. Keeping a rolling 2-year window of data is made easier if each partition corresponds to one day's worth of data finally, partitioning can cluster data relevant to answering a query (i.e., sum sales by day). A very large data table will be composed of hundreds to thousands of data partitions. For example, a typical conventional database 100 is shown in FIG. 1. Database 100 includes a number of data partitions, such as data partitions 102A–C. Each data partition includes a number of rows of data, such as rows 104A and 104B. Each row includes a number of keys, such as keys 106A and 106B.

A typical database organization is to have separate indexes for each data partition. Such an organization simplifies data management (indexes are dropped with data), reduces index size (which can be a significant fraction of the data size), and increases index concurrency (which can be a bottleneck). For example, in FIG. 1, each data partition 102A–C of database 100 has its own indexes 108A–C. These prior art indexes are termed dense indexes, because each index refers to every record in its data partition.

Data warehouses allow users to make sense of large quantities of detail data, typically by extracting summaries small enough for convenient manipulation. While most queries can be answered through the summary data, some queries can only be answered by accessing the detail data. For example, after using the summaries to identify a set of "interesting" customers, it may be desired to extract all detail records that describe an interaction with those customers. If the number of customers in the database is very large, it is likely that most of the data partitions of the table do not contain records describing an interaction with a particular customer. In a conventional database architecture, searching for these records requires that every index be searched for the key value. The cost of opening the index files and searching them can be much larger than the cost of retrieving the records that match the key value. The problem is that many index searches return a "not found" answer.

A need arises for a technique by which a very large database can be searched more quickly and with lower cost than can be achieved using a conventional database access technique.

SUMMARY OF THE INVENTION

The present invention is a coarse database index, and system and method of use therefor, that will quickly indicate which data partitions of a table contain a given key. Once the target data partitions are located, the exact record locations can be found using traditional indexes. The coarse indexes take little space, can be updated quickly, and searched quickly.

A coarse index, according to a preferred embodiment of the present invention, is in conjunction with a database including a plurality of data partitions. Each data partition includes data, including a plurality of key values of at least one key, and at least one dense index referencing the data. The coarse index indexes the plurality of key values according to data partitions containing each key value. The coarse index includes a first bitmap, which includes a plurality of bits arranged in a matrix. The first axis of the matrix represents data partitions, while the second axis of the matrix represents key values. Each bit indicates whether a key value is present in a data partition. Preferably, the first bitmap is arranged in key value major format.

The coarse index may also include a second bitmap, which includes a plurality of bits arranged in a matrix. The first axis of the matrix represents data partitions, while the second axis of the matrix represents key values. Each bit indicates whether a key value is present in a data partition. Preferably, the second bitmap is arranged in data partition major format.

In one aspect of the present invention, the second bitmap may be transformed from data partition major format to key value major format. In another aspect of the present invention, the first bitmap is compressed and is partitioned into a plurality of blocks. The coarse index further includes an index referencing each block of the first bitmap to a portion of an uncompressed first bitmap corresponding to each block In still another aspect of the present invention, the second bitmap is compressed and is partitioned into a plurality of blocks. The coarse index further includes an index referencing each block of the second bitmap to a portion of an uncompressed second bitmap corresponding to each block.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
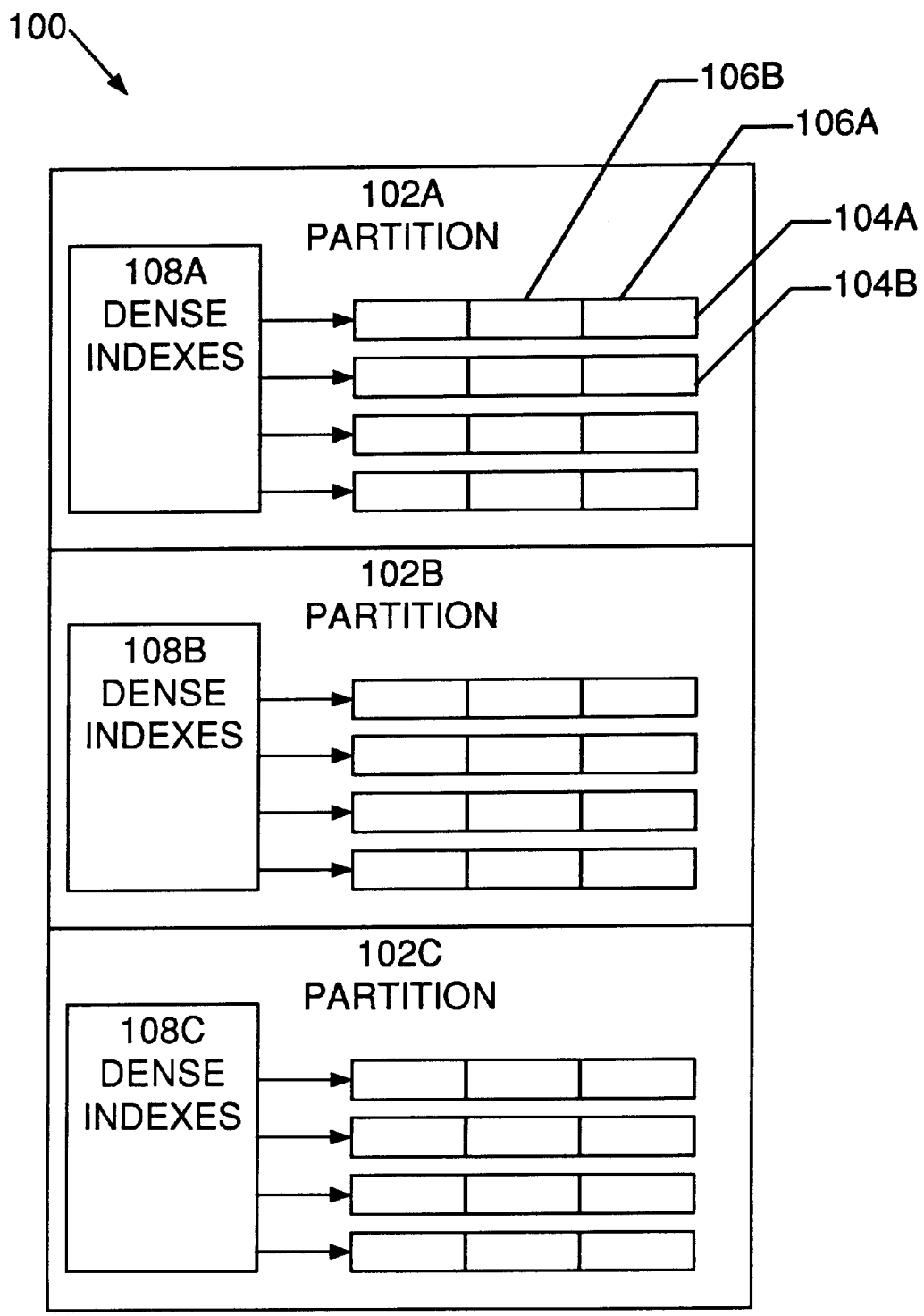
FIG. 1 is an exemplary block diagram of a conventional database.
Figure 2:
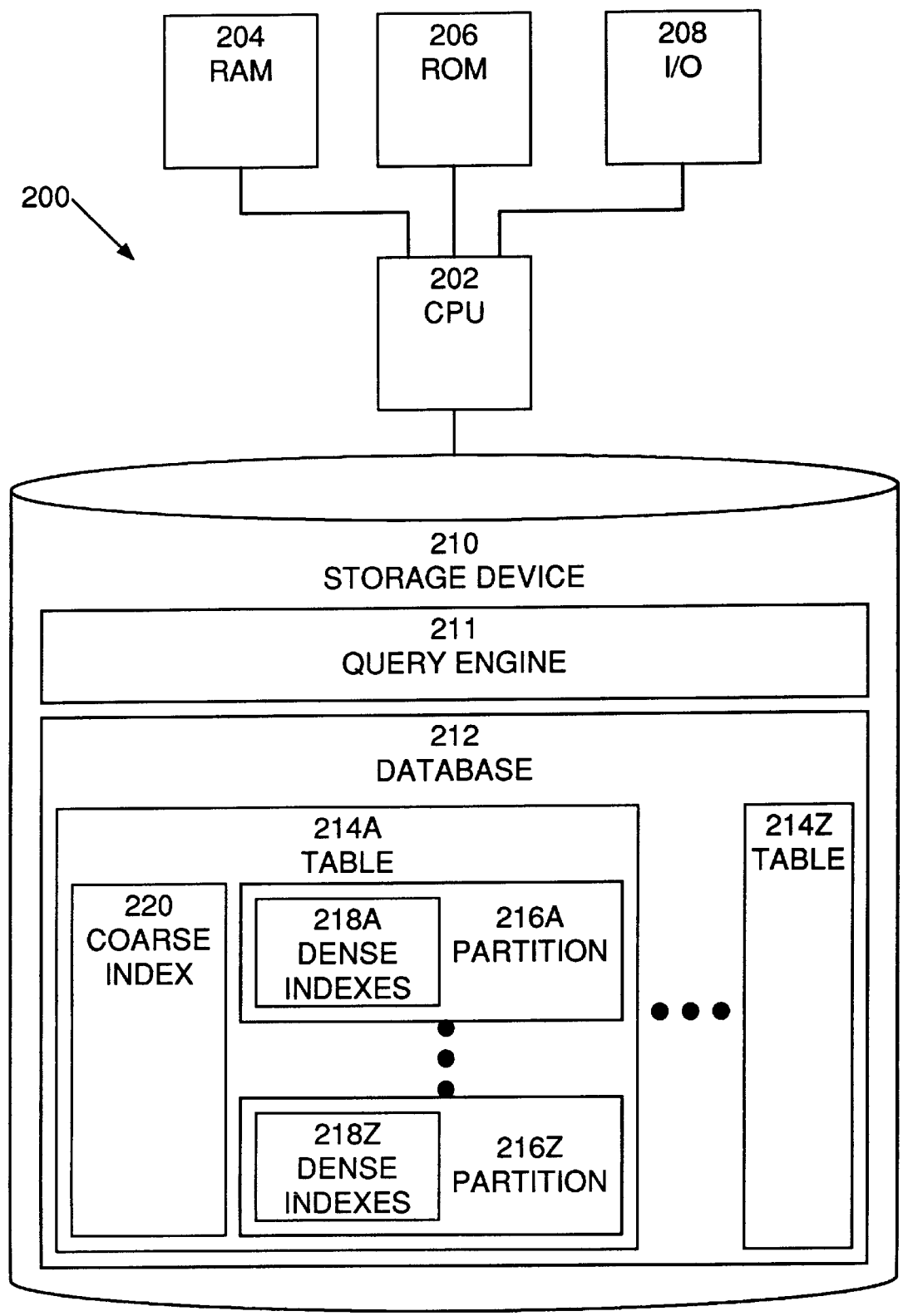
FIG. 2 is an exemplary block diagram of a database system, according to the present invention.

An exemplary database system 200, according to the present invention, is shown in FIG. 2. System 200 includes central processing unit (CPU) 202, which is connected to random access memory (RAM) 204, read-only memory (ROM) 206, input/output devices (I/O) 208 and storage device 210. CPU 202 may comprise a microprocessor, for example, an INTEL PENTIUM processor, or CPU 202 may comprise a mini-computer or mainframe processor. RAM 204 and ROM 206 store program instructions that are executed by CPU 202 and data that is used during program execution. I/O devices 208 may include any devices used to input data to system 200, such as a keyboard, mouse, trackpad, trackball and graphics tablet, to output data from system 200, such as a display and a printer, and to both input and output data, such as a modem and a network adapter. Storage device 210, which stores data that is used by the present invention, may comprise, for example, a magnetic disk and/or optical disk and may also comprise a magnetic tape.

Storage device 210 includes query engine 211 and database 212. Query engine 211 is typically a software module that parses and evaluates database queries and extracts the required information from the database. Queries are typically specified using a query language, such as the well-known Structured Query Language (SQL). Database 212, which is typically stored as one or more files, includes one or more tables 214A–Z, which are compilations of information. Generally, tables are conceptualized as being organized in rows and columns, although the storage format may be different. Large tables are divided into a plurality of subtables or data partitions, such as data partitions 216A–Z. Each data partition includes data, typically arranged in rows and columns, and one or more dense indexes, such as dense indexes 218A and 218Z. A dense index is a non-clustered index that contains a reference to every data record within the scope of the index. Thus, each dense index indexes the key values of each record in its partition. Each table also includes one or more coarse indexes, such as coarse index 220. A coarse index is a non-clustered index that does not contain a reference to every data record within the scope of the index. Thus, coarse index 220 indexes key values according to the data partitions containing each value, rather than by the specific row (record), in which the key value is found.

Figure 3:
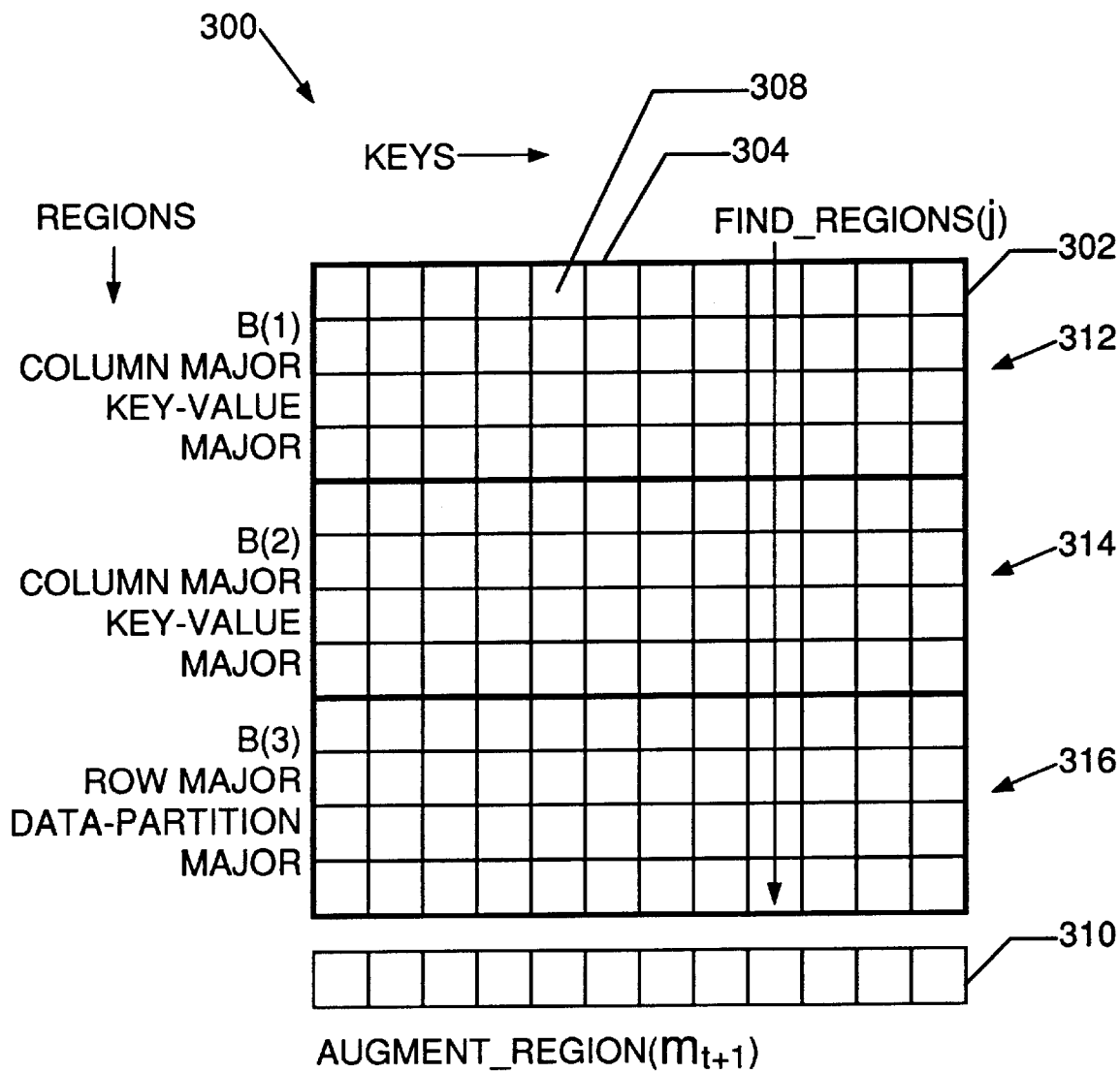
FIG. 3 is an exemplary diagram of a coarse index, according to the present invention.

An exemplary coarse index 300, according to the present invention, is shown in FIG. 3. In a preferred embodiment, coarse index 300 is a bitmap including rows, such as Tow 302, and columns, such as column 304. Each row corresponds to a data partition in the database that is indexed by the coarse index. Each column represents a specific key value of a key. In a preferred embodiment, each entry, such as entry 308, is located at a specific row and column. The entry takes the value 0 if no key of the key value indicated by the column position exists in the partition indicated by the row position.

In a typical data warehousing application, as data is added to the database, the new data is included in new data partitions, rather than incorporated into old data partitions. Since each row in the coarse index represents a data partition, the coarse index may be extended to index a new data partition by adding new rows, such as row 310, to the index. In a preferred embodiment, a plurality of rows may be grouped together to form subunits of the coarse index. Such subunits are teemed bitmap partitions and are useful in implementing coarse index processing with improved performance. For example, bitmap partitions B(1) 312, B(2) 314, and B(3) 316 are shown in FIG. 3. Bitmap partitions B(1) 312 and B(2) 314 are in column major order. Since the columns represent key-values, bitmap partitions B(1) 312 and B(2) 314 are also in key-value major order. In column-major order, adjacent bits in a column are adjacent in the bitmap. Thus, the bits representing each key-value are adjacent in the bitmap. Bitmap partition B(3) 316 is in row major order. Since the rows represent data-partitions, bitmap partition B(3) 316 is thus also in data-partition major order. In row-major order, adjacent bits in a row are adjacent in the bitmap. Thus, tie bits representing each data-partition are adjacent in the bitmap.

A preferred embodiment of a coarse index may be described more analytically as follows. An indexed table is divided into a set of regions, where each region corresponds to a horizontal data partition. The universe of possible key values for key K is $K=\{k_1 k_2, \ldots, k_n\}$. The set of regions that are to be indexed is $R=\{r_1, r_2, \ldots\}$. At time t, a prefix of R is revealed to us, which is $R_1=\{r_1, \ldots r_{m_t}\}$. A bitmap index, according to the present invention, at time t is $B_t$, an $m_t$ by n zero-one matrix. Entry (ij) in $B_t$ is 1 if in region $r_i$ there exists a record with key value $K=k_j$, else the entry is 0.

The two operations on $B_t$ are:
1. find_regions(j): Return the set r(j) such that $i \in r(j)$ if entry (ij) is in the set $B_t$.
2. augment_region($m_{t+1}$): If $m_{t+1}=m_t+1$, then transform $B_t$ into $B_{t+1}$ by appending the row ($m_t+1$, *) to $B_t$.

These definitions assume that the key values are drawn from a finite set. In any settings, such as indexing on telephone number or social security number, this assumption holds. If the key value is an arbitrary length string, then the string can be hashed into an integer within a convenient range.

In a preferred embodiment, as shown in FIG. 3, bitmap B is partitioned by sequences of rows into a plurality of bitmap partitions, B(t). The initial set of bitmap partitions, such as bitmap partitions B(1) 312 and B(2) 314, are in column-major order (key-value major order). In column-major order, adjacent bits in a column are adjacent in the bitmap. This arrangement provides optimum performance for accessing the index. The last bitmap partition, B(3) 316, which is the bitmap partition containing the most recently added data, is in row-major order (data-partition major order), which improves data addition performance. In row-major order, adjacent bits in a row are adjacent in the bitmap.

Let B(i) be the bitmap partition that represents regions ($l_i$, *) through ($l_{i+1}-1$,*). At a given time t, there is a $m_t$ that has been revealed. Let s be the maximum value of i such that $l_i+1<=m_t$. Then, B(1) through B(s) (B(1) through B(2) in FIG. 3) are stored in column-major key-major) order to make the queries fast, while B(s+1) (B(3) in FIG. 3) is stored in row-major (region-major) order so that updates can be fast.

When a bitmap partition that corresponds to a data partition is stored in column-major order, the bits that identify which regions contain key $k_j$ are consecutive. In particular, suppose that bit (ij), representing the presence of key $k_j$ in region $r_i$, is in data partition b. Then (ij) is represented by bit position $j * (l_{b+1}-l_b)+i-l_b$ in B(b), (such as B(1) or B(2) in FIG. 3). When a bit partition is stored in row-major order, the bits that identify which keys are in a region are consecutive. In particular, bit (ij) is represented by bit position $n(i-l_b)+j$ in bitmap portion B(b). Storing B(s+1) in region-major (row-major) order makes updates fast because the bitmap of ($m_t$,*) is appended to the existing representation of B(s+1). When $s_{t+1}=s_t+1$, the representation of the bitmap partition B($s_t$) is transformed into key-major (column-major) order.

Figure 4:
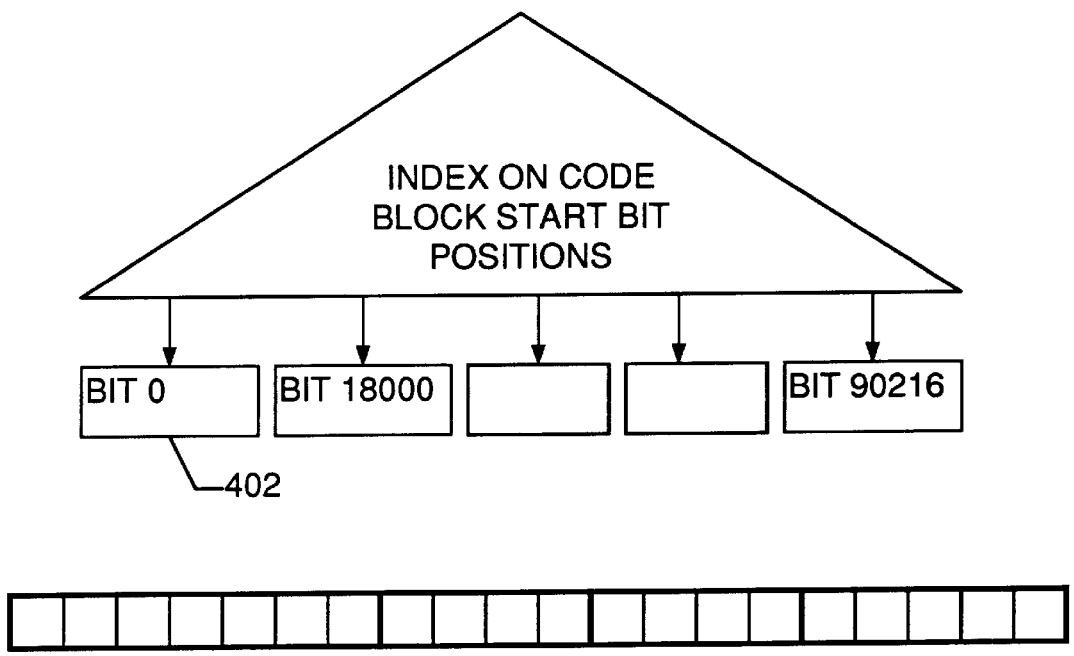
FIG. 4 is an exemplary diagram of compressed bitmap code word partitioning, according to the present invention.

In order to conserve storage space, each bitmap may be compressed. The bitmap compression may use any suitable well-known compression method, such as run-length encoding, compressed run-length encoding, BBC codes, etc. Even when the bitmap partition B(s) is stored in key-major order, finding the regions where a record with a given key value is present requires a read of half the bitmap, on average. For very large scale indexes (Gbytes), this poses a performance problem. To speed up queries, the compressed bitmap is indexed. The compressed bitmap code words are partitioned into blocks, such as block 402. The blocks are indexed by the region of the bitmap that the code words represent, as shown in FIG. 4. Suppose that code word block $c_i$ represents bits $z_i$ through $z_{i+1}-1$. If $z_i \leq a < z_{i+1}$, then code word block $c_i$ contains the representation of bit a. To find the value of a, find the value of bit $a-z_i$ from the code words in $c_i$. For example, in FIG. 4, code word block 402 includes representations of bits 0–17999, so $z_i=0$ and $z_{i+1}=17999$. To find a particular bit in that range, such as a=10000, block 402 is accessed and bit $a-z_i$, 10000−0=10000, is accessed. Because the bits in the indexed bitmap have a linear order, a wide range of standard indexing schemes can be used (e.g., a B-tree index).

Because the code words are indexed, it is desirable to use an encoding in which the code words always end on byte boundaries. A suitable compression scheme is that described in the article "Two-sided Bitmap Compression", by Gennady Antoshenkov, *Technical Report,* Oracle Corp., 1996. However, other compression schemes are also usable. For example, if the bitmap is run-length encoded, the well-known gzip compression may be performed on the run-length encoding of the bitmap. Other encoding schemes that may be suitable include Golomb encoding, exp-Golomb encoding and delta-gamma encoding.

If a data partition of the bitmap index is stored in column-major order, then only a few I/Os are required to perform a find_regions(j) operation (one or two to read the index, plus one or two to read bitmap code blocks). Performing range queries is fast, because bits for consecutive keys are stored consecutively. Querying a data partition stored in row-major order will take longer, but only one such data partition will be stored and it can be transposed when it becomes large. Because row-major bitmaps store bits for consecutive keys consecutively, range queries on the row-major data partition will not usually require more I/O than the find_regions(j) operation.

The indexed bitmap scheme of the present invention requires that a row-major representation of B(s) be transposed into a column-major representation. This can be accomplished by reading the row-major bitmap once and writing out the column-major bitmap. A suitable procedure for accomplishing this task makes use of the following procedures and object methods:

1. RL_gen initize_region_RL(Indexed_bitmap B, int i): This object constructor creates a run-length code generator on the indexed compressed bitmap for region i.
2. CM_gen initialize_column_major_gen(RL_gen array region_RL, int R): This object constructor creates an object that merges the run-length codes of each region 1, . . . , R to create a run-length encoding of the column-major bitmap.
3. CM_gen->finished( ): returns true when the CM_gen object has returned all of its run-length codes.
4. CM_gen->generate_RL( ): The CM_gen object returns its next run-length code.
5. Indexed_bitmap generate_indexed_bitmap(RL_code array RL, int R): Returns an indexed and compressed representation of the run-length codes in RL.

The CM_gen object returns a stream of successive run-length codes of the column-major bitmap through calls to CM_gen->generate_RL( ). The key idea is to observe that if the j-th bit in region i is set, and there are n possible key values, then bit n * i+j is set in the column-major bitmap. The initial bit positions of the R regions are stored in a heap. These bitmaps are merged by the usual algorithm. Once these functions and object methods are available, the bitmap transposition algorithm is a matter of initializing the CM-gen object, storing the run-length codes, then creating an indexed bitmap from the codes.

The transposition procedure is shown in TABLE A.

TABLE A

```
Transpose(Indexed_bitmap B){
    Let R be the number of regions in B.
    For j = 0 to R-1 do {
        region_RLU[j] = initialize_region_RL(B,j) }
    column_major_gen = initialize_column_major_gen
    (region_RL,R)
    num_RL = 0
    while(not column_major_RL->finished(){
        column_major_RL[num_RL++]=column_major_
        gen->generate_RL()
    }
    B_column_major = generate_indexed_bitmap(column_
    major_RL,num_RL)
    return( B_column_major)
}
```

The procedure presented here makes the simplifying assumption that the run-length encoding of the column-major bitmap can fit into memory. If the run-length encoding cannot fit into memory, then the indexed bit map must be generated incrementally. Each time the column_major_RL array fills up, an indexed bitmap method is called which appends bits represented by the column_major_RL array to the current bitmap. While this detail is omitted to simplify the presentation, the preferred embodiment of the indexed bitmap transposition algorithm builds the transposed indexed bitmap incrementally.

Query performance will improve if each bitmap partition B(s) contains as many regions as possible. The nature of the application will suggest a natural size for B(s) to one of skill in the art. A hierarchical approach may be used, creating $k_2$ coarse indexes over $k_1$ regions each, then combining them into a single coarse index over $k_1 k_2$ regions.

Figure 5:
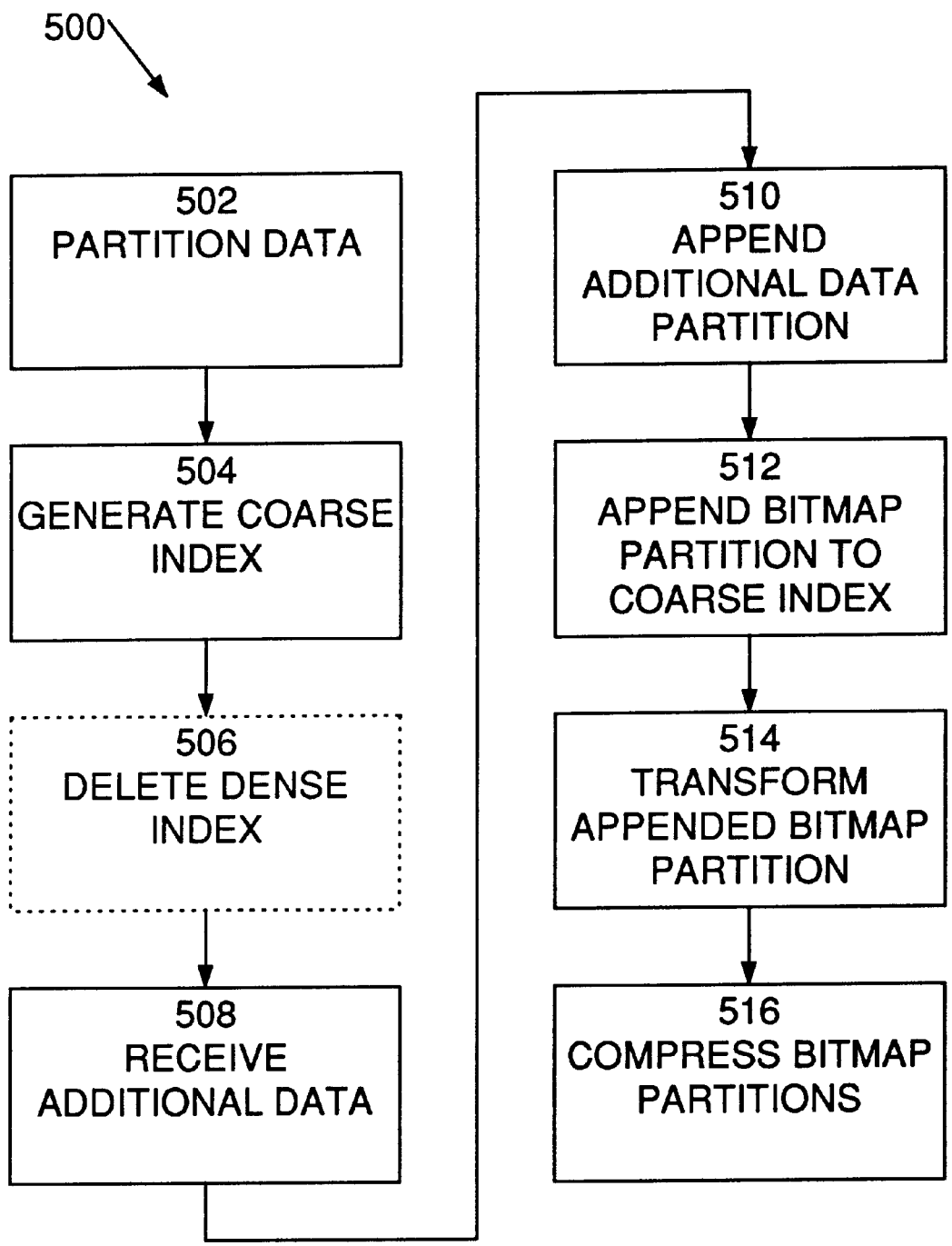
FIG. 5 is a flow diagram of a process for operating a database system, such as the database system of FIG. 2, according to the present invention.

A process 500, for opting a database system, such as the database system shown in FIG. 2, is shown in FIG. 5. FIG. 5 is best viewed in conjunction with FIG. 2. The method begins with step 502, in which data is partitioned to form a plurality of data partitions 216A–Z, shown in FIG. 2. Each data partition includes a portion of data and at least one dense index 218A referencing the portion of data. In step 504, a coarse index 220 is generated. Coarse index 220 includes a plurality of bitmap partitions, such as partitions 312 and 314, which are in column major order. Since the columns represent key-values, bitmap partitions 312 and 314 are also in key-value major order. In column-major order, adjacent bits in a column are adjacent in the bitmap. Thus, the bits representing each key-value are adjacent in the bitmap.

In optional step 506, the dense index 218A may be deleted after generation of the coarse index 220 in step 504. This step may performed when, for example, tape-resident data is processed.

In step 508, additional data is received. In step 510, at least one additional data partition, including the received data, is appended to the database. In step 512, an additional bitmap partition, which indexes the additional data partition, is appended to the coarse index. The appended bitmap partition is arranged in row major order. Since the rows represent data-partitions, the appended bitmap partition is thus also in data-partition major order. In row-major order, adjacent bits in a row are adjacent in the bitmap. Thus, the bits representing each data-partition are adjacent in the bitmap. The arrangement in data-partition (row) major format improves the speed of appending and updating the bitmap partition.

In step 514, the appended bitmap partition is transformed to key-value major format, in accordance with the format of the earlier-added partitions of the coarse index. In step 516, the uncompressed bitmap partitions are compressed. Then, each compressed partition is partitioned into a plurality of blocks, and an index referencing each block of the compressed bitmap partition to a portion of the bitmap partition corresponding to each block, as shown in FIG. 4, is generated.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A database system comprising:

a processor;

a storage device containing a database, wherein the database comprises:
 a plurality of data partitions, each data partition comprising:
  data, including a plurality of key values of at least one key; and
 a coarse index indexing the plurality of key values according to data partitions containing each key value, wherein the coarse index comprises a first bitmap partition comprising a plurality of bits arranged in rows and columns, each row corresponding to a data partition, each column corresponding to a key value, wherein each bit indicates whether a key value is present in a data partition, arranged in key value major format; and means for appending a second bitmap partition to the coarse index, the second bitmap partition comprising:
 a plurality of bits arranged in rows and columns, each row corresponding to a key value, each column corresponding to a data partition, wherein each bit indicates whether a key value is present in a data partition, arranged in data partition major format.

2. The database system of claim 1, further comprising:

means for transforming the second bitmap partition from data partition major format to key value major format.

3. The database system of claim 2, further comprising:

means for compressing the first bitmap partition;

means for partitioning the compressed first bitmap partition into a plurality of blocks; and means for generating an index referencing each block of the compressed first bitmap partition to a portion of the first bitmap partition corresponding to each block.

4. The database system of claim 3, further comprising:

means for compressing the second bitmap partition;

means for partitioning the compressed second bitmap partition into a plurality of blocks; and means for generating an index referencing each block of the compressed second bitmap partition to a portion of the second bitmap partition corresponding to each block.

5. A coarse index for a database comprising a plurality of data partitions, each data partition comprising data, including a plurality of key values of at least one key, the coarse index comprising:

a first bitmap partition comprising a plurality of bits arranged in a matrix, a first axis of the matrix representing data partitions, a second axis of the matrix representing key values, wherein each bit indicates whether a key value is present in a data partition, wherein the first bitmap partition is arranged in key value major format; and a second bitmap partition comprising a plurality of bits arranged in a matrix, a first axis of the matrix representing data partitions, a second axis of the matrix representing key values, wherein each bit indicates whether a key value is present in a data partition, wherein the second bitmap partition is arranged in data partition major format.

6. The coarse index of claim 5, wherein the first bitmap partition is compressed and is partitioned into a plurality of blocks and the coarse index further comprises:

an index referencing each block of the first bitmap partition to a portion of an uncompressed first bitmap partition corresponding to each block.

7. The coarse index of claim 6, wherein the second bitmap partition is compressed and is partitioned into a plurality of blocks and the coarse index further comprises:

an index referencing each block of the second bitmap partition to a portion of an uncompressed second bitmap partition corresponding to each block.

8. A method of operating a database system comprising the steps of:

partitioning data to form a plurality of data partitions, each data partition including a portion of data;

generating a coarse index indexing a plurality of key values according to data partitions containing each key value, wherein the coarse index comprises a first bitmap partition comprising a plurality of bits arranged in a matrix, a first axis of the matrix representing data partitions, a second axis of the matrix representing key values, wherein each bit indicates whether a key value is present in a data partition;

receiving additional data;

appending at least one additional data partition to the database; and appending a second bitmap partition to the coarse index, the second bitmap partition comprising:
 a plurality of bits arranged in rows and columns, each row corresponding to a data partition, each column corresponding to a key value, wherein each bit indicates whether a key value is present in a data partition, arranged in data partition major format.

9. The method of claim 8, further comprising the step of:

transforming the second bitmap partition from data partition major format to key value major format.

10. The method of claim 9, further comprising the steps of:

compressing the first bitmap partition;

partitioning the compressed first bitmap partition into a plurality of blocks; and generating an index referencing each block of the compressed first bitmap partition to a portion of the first bitmap partition corresponding to each block.

11. The method of claim 10, further comprising the steps of:

compressing the second bitmap partition;

partitioning the compressed second bitmap partition into a plurality of blocks; and generating an index referencing each block of the compressed second bitmap partition to a portion of the second bitmap partition corresponding to each block.

* * * * *